G. B. de BOUCHERVILLE.
Propulsion of Vessels.

No. 143,440. Patented Oct. 7, 1873.

Witnesses:
A. Bennewendorf.
Alex F. Roberts

Inventor:
G. Boucher de Boucherville
Per Munn
Attorneys.

UNITED STATES PATENT OFFICE.

GEORGE BOUCHER DE BOUCHERVILLE, OF QUEBEC, CANADA.

IMPROVEMENT IN PROPULSION OF VESSELS.

Specification forming part of Letters Patent No. 143,440, dated October 7, 1873; application filed July 19, 1873.

*To all whom it may concern:*

Be it known that I, GEORGE B. DE BOUCHERVILLE, of city of Quebec and Province of Quebec, Canada, have invented a new and useful Improvement in Wave-Motors; and I do hereby declare that the following is a full, clear, and exact description of the same, reference being had to the accompanying drawing forming a part of this specification.

The invention consists in an improved motor for turning the propeller-screw of a ship, vessel, or boat, as hereinafter described.

Figure 1:
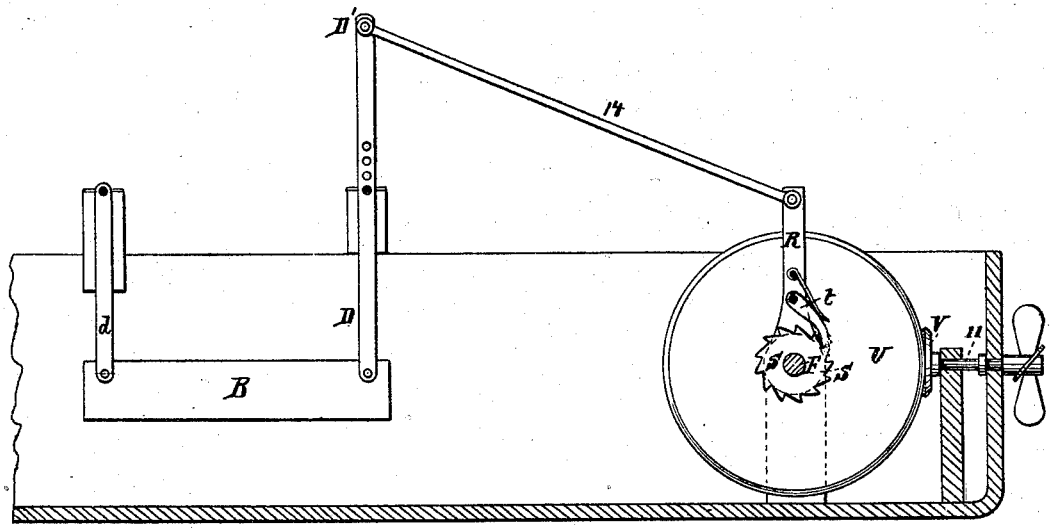
Figure 2:
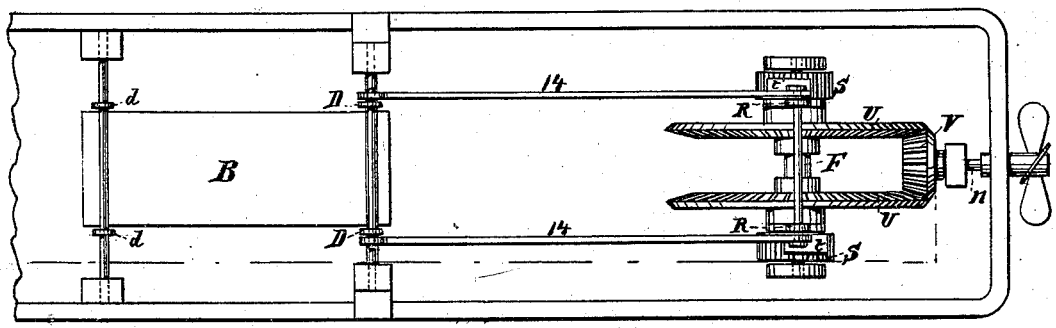

Figure 1 is a longitudinal sectional elevation; Fig. 2, a plan view.

B is a platform, suspended by pivoted rods D d, of which the former are extended each to a point, D', whereat is pivoted the bars 14 14, which are also pivoted at their other ends to vibratory rods R R, having reversed spring-pawls t t. These pawls move alternately the ratchet-wheels S S, which are rigidly attached to independent sleeves that are loose on a shaft, F, and have each a bevel spur-wheel, U. These wheels are thus enabled each to rotate the wheel V on propeller-shaft alternately in the same direction.

The platform being undulated or vibrated by the wave-motion, I am enabled through this mechanism to utilize this force and communicate the same to the propeller.

Having thus described my invention, what I claim as new, and desire to secure by Letters Patent, is—

In connection with a vessel, the propeller-shaft, the pinion V, bevel-wheels U U on independent sleeves of the same shaft, F, ratchet-and-pawl mechanism R t S, bars 14, rods D d, and the suspended platform B, all combined as and for the purpose described.

GEORGE BOUCHER DE BOUCHERVILLE.

Witnesses:
    A. P. THAYER,
    T. B. MOSHER.